(12) United States Patent
Zimmermann et al.

(10) Patent No.: US 7,842,130 B2
(45) Date of Patent: Nov. 30, 2010

(54) COMPLEX INORGANIC EFFECT MATERIALS

(75) Inventors: Curtis J. Zimmermann, Cold Spring, NY (US); Frank Mazella, Rhinebeck, NY (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 11/464,545

(22) Filed: Aug. 15, 2006

(65) Prior Publication Data

US 2007/0039521 A1    Feb. 22, 2007

Related U.S. Application Data

(60) Provisional application No. 60/595,982, filed on Aug. 22, 2005.

(51) Int. Cl.
| | |
|---|---|
| *C09C 1/00* | (2006.01) |
| *C09C 1/14* | (2006.01) |
| *C09C 1/34* | (2006.01) |
| *C04B 14/20* | (2006.01) |
| *B05D 7/00* | (2006.01) |

(52) U.S. Cl. .................. 106/415; 106/417; 106/434; 106/454; 427/212

(58) Field of Classification Search ............. 106/415, 106/417, 434, 454; 428/144; 359/296; 149/19.1; 427/212
See application file for complete search history.

(56) References Cited

U.S. PATENT DOCUMENTS

| | | | |
|---|---|---|---|
| 3,087,828 A | 4/1963 | Linton | |
| 3,087,829 A | 4/1963 | Linton | |
| 3,553,001 A | 1/1971 | Koblschutter et al. | |
| 3,711,308 A | 1/1973 | Brand et al. | |
| 3,874,890 A | 4/1975 | Bernhard et al. | |
| 4,146,403 A | 3/1979 | Armanini et al. | |
| 4,344,987 A | 8/1982 | Ostertag et al. | |
| 4,552,593 A | 11/1985 | Ostertag | |
| 4,675,262 A * | 6/1987 | Tanaka | 430/58.05 |
| 5,137,575 A | 8/1992 | Yasuki et al. | |
| 6,280,520 B1 | 8/2001 | Andes et al. | 106/415 |
| 6,517,628 B1 * | 2/2003 | Pfaff et al. | 106/417 |
| 6,596,070 B1 | 7/2003 | Schmidt et al. | 106/417 |
| 6,616,745 B1 * | 9/2003 | Narvarti et al. | 106/417 |

FOREIGN PATENT DOCUMENTS

| | | | |
|---|---|---|---|
| WO | WO 2004/065295 | * | 8/2004 |
| WO | WO 2004/104110 | * | 12/2004 |

OTHER PUBLICATIONS

Handbook of Chemistry and Physics, Robert C. Weast, Ph.D., 56th Edition, pp. F82-F83.*
Handbook of Chemistry and Physics, Robert C. Weast, Ph.D., 56$^{th}$ Edition, pp. F82-F83.*

* cited by examiner

*Primary Examiner*—Anthony J Green
*Assistant Examiner*—Pegah Parvini
(74) *Attorney, Agent, or Firm*—Bernard Lau

(57) ABSTRACT

The present invention relates to a complex inorganic color effect pigment material based on multiply coated platelet-shaped substrates wherein one of the layers is a complex inorganic colored pigment. The present color effect pigment may be used in automotive applications, security inks, and decorative coatings.

8 Claims, No Drawings

COMPLEX INORGANIC EFFECT MATERIALS

This patent application claims the priority to pending U.S. provisional patent application Ser. 60/595,982 filed Aug. 22, 2005 incorporated herein in its entirety.

FIELD OF THE INVENTION

The present invention relates to complex inorganic color effect materials based on multiply coated platelet-shaped substrates. In particular, the invention relates to multilayer encapsulated particulates capable of managing white light through optical interference resulting in unique angular dependent color effects.

BACKGROUND OF THE INVENTION

Many pearlescent or nacreous pigments, also known as color effect materials (CEM's) are based on the use of a laminar substrate such as mica which have been coated with a metal oxide layer. As a result of reflection and refraction of light, these pigments exhibit pearl-like luster and depending on the thickness of the metal oxide layer, they can also exhibit interference color effects. The pearlescent pigments encountered on a commercial basis are most often either titanium dioxide-coated mica or iron oxide-coated mica pearlescent pigments. Both types are well known in the art.

The overcoating of the titanium dioxide-coated or iron oxide-coated mica pearlescent pigment is also well known in the art. See, for example, U.S. Pat. Nos. 3,087,828; 3,087,829; 3,711,308; 3,874,890; 4,146,403; 4,886,100; and 5,137,575.

Color effect material or special-effect pigments are employed in numerous fields in industry, especially in the sector of automotive finishes, in decorative coating, in plastics, in paints, in printing inks, cosmetics and personal care formulations.

Color effect material which exhibit an angle-dependent color change between two or more interference colors have a play of color which makes them of particular interest for automotive finishes and in connection with counterfeit-protected documents of value. CEM's of this kind on the basis of multiply coated platelet-shaped substrates are known.

CEM's consist generally of platelet-shaped substrates with a thickness of from 200 to 10000 nm which are coated with highly refractive metal oxides or metal oxide mixtures with a thickness of from 50 to 300 nm. The optical properties of these pigments are critically determined by the refractive index of the metal oxide layer. In addition to the possibility of using chemical vapor deposition (CVD) or physical vapor deposition (PVD) techniques to prepare metal oxide layers having high densities and refractive indices that lie close to the optimum, the deposition of metal oxides on finely divided, platelet-shaped substrates is frequently accomplished by titrating aqueous, usually acidic metal salt solutions against sodium hydroxide solution in the presence of a substrate, as described, for example, in DE 14 67 468 and DE 20 09 566.

JP H7-759 discloses a multilayer interference pigment with metallic luster, for which a substrate is coated with alternate layers of titanium dioxide and silicon dioxide. The substrate comprises flakes of aluminum, gold or silver, or of mica or glass, with a coating of metals. The depth effect which is characteristic of and desired for interference pigments, however, cannot be generated. This is because of the total reflection of the light at the metal layer which forms the core. Consequently, the interference effect remains limited to the layers which are located on the metal layer. Furthermore, the lack of transparency of the substrate greatly restricts the diverse possibilities for combination with further pigments in applications-related formulations.

U.S. Pat. No. 6,596,070 provides an essentially transparent interference pigment which is based on multiply coated, platelet-shaped substrates and comprises a particular arrangement of optically functional layers by means of which particular optical effects are achieved. The invention provides interference pigments on the basis of multiply coated, platelet-shaped substrates which comprise at least one layer sequence comprising (A) a coating having a refractive index $n \geq 2.0$, (B) a colorless coating having a refractive index $n \leq 1.8$, and (C) a coating of high refractive index, and, if desired, (D) an external protective layer.

Copper chromite, also known as Pigment Black 28, is a black material. When it is coated in a sufficient quantity on a laminar or platy substrate such as mica, the coating is opaque. In contrast, pearlescent pigments are based on the fact that there is reflection at the surface of the coating and also a transmission through the coating to the next interface, and reflection at that next interface.

In commonly assigned U.S. Pat. No. 6,616,745, it had been discovered that when copper chromite is coated onto a metal oxide-coated, e.g. a titanium dioxide- or iron oxide-coated mica pearlescent pigment, there is color advancement of the interference color and an increase in the opacity of the pigment. It had also been found that when the layer is thick enough, the color progresses to the next shade and 100% opacity could be achieved at lower pigment loads.

It had also been found that copper chromite can be coated onto a platy substrate, e.g., mica, kaolin, etc., and then coated with a metal oxide layer which produces colored black pigments. The initial layer of copper chromite can be of sufficient quantity to be opaque (about 45% $CuCr_2O_4$ when the substrate is mica) or semitransparent. Commonly assigned U.S. Pat. No. 6,616,745 is hereby incorporated by reference.

SUMMARY OF THE INVENTION

The present invention relates to complex inorganic color effect materials based on multiply coated platelet-shaped substrates wherein one of the layers is a complex inorganic colored pigment.

DETAILED DESCRIPTION OF THE INVENTION

The complex inorganic effect materials of the present invention are multilayer encapsulated particulates including a laminar substrate coated with layers having different refractive indexes. Suitable laminar substrates include mica, fluorophlogopite (synthetic mica), glass flake, platy alumina, metal flake, platy ceramic, silica, etc. The substrate is then coated with a multilayered arrangement where high refractive index materials flank a layer of low refractive index material. The inorganic color effect material may utilize an external layer coating the outermost high refractive index layer of the multilayered arrangement or non-optically active inter-layers for enhancing mechanical properties, interfacial adhesion, weather stability, tactile properties or electromagnetic properties.

The size of the laminar substrate per se is not critical and can be matched to the particular target application. In general, the platelet-shaped substrates have a thickness of between about 0.1 and about 5 microns, in particular between about 0.2 and about 4.5 microns. The extent in the two other dimensions is usually between about 1 and about 250 microns, preferably between about 2 and about 200 microns and, in particular, between about 5 and about 50 microns.

A CEM has now been found which is based on multiply coated, platelet-shaped substrates and comprises a particular arrangement of optically functional layers by means of which particular optical effects are achieved.

The invention therefore provides color effect materials on the basis of multiply coated, platelet-shaped substrates which comprise at least one layer sequence comprising (A) a coating having a refractive index≧1.95, (B) a colorless coating having a refractive index≦1.9, and (C) a coating of high refractive index, and, if desired, (D) an external layer, wherein (A), (C), and/or (D) comprise a complex inorganic color pigment.

The thickness of the individual layers of high and low refractive index on the platelet substrate is essential for the optical properties of the pigment. For a pigment with intensive interference colors, the thickness of the individual layers must be adjusted precisely with respect to one another.

If n is the refractive index of a thin layer and d its thickness, the interference color of this layer is defined by the product n×d (n×d=optical thickness). The colors which result from such a film under perpendicular light incidence in reflected light result from an intensification of the light of wavelength lambda=(4/2N−1)×n×d and by an attenuation of the light of wavelength lambda=(2/N)×n×d where N is a positive integer.

The variation in color which results with increasing film thickness is a consequence of the intensification or attenuation of certain light wavelengths through interference. If two or more layers in a multilayer pigment possess the same optical thickness, the color of the reflected light becomes more intense as the number of layers increases. In addition to this, it is possible through an appropriate choice of layer thicknesses to achieve a particularly strong variation of the color as a function of the viewing angle. A pronounced, so-called color flop is developed. The thickness of the individual metal oxide layers, irrespective of their refractive index, depends on the field of use and is generally from 10 to 1000 nm, preferably from 15 to 800 nm and, in particular, 20-600 nm.

The color effect materials of the invention feature a layer coating (A) of high refractive index in combination with a colorless layer coating (B) of low refractive index and located thereon a coating layer (C) of high refractive index. The pigments can comprise two or more, identical or different combinations of layer assemblies, although preference is given to covering the substrate with only one layer assembly (A)+(B)+(C).

The layer (A) of high refractive index has a refractive index≧1.95, preferably ≧2.0. Materials suitable as the layer material (A) are all materials known to the skilled worker which are of high refractive index, and can be applied permanently to the substrate particles. Particularly suitable materials are metal oxides, hydroxides or metal oxide/hydroxide mixtures, such as $TiO_2$, $Fe_2O_3$, $ZrO_2$, ZnO or $SnO_2$, or compounds of high refractive index such as, for example, iron oxide hydrates, titanium suboxides, chromium oxide.

The thickness of the layer (A) is 10-550 nm, preferably 15-400 nm and, in particular, 20-350 nm.

The layer (B) of low refractive index will generally have a refractive index≦1.9, preferably ≦1.7. Colorless materials of low refractive index suitable for the coating (B) are preferably metal oxides or the corresponding oxide hydrates, such as $SiO_2$, $Al_2O_3$, AlO(OH), $B_2O_3$, a mixture of these metal oxides or magnesium fluoride. The thickness of the layer (B) is 10-1000 nm, preferably 20-800 nm and, in particular, 30-600 nm.

A low refractive index material used to make the CEM is preferably silica. While silica can have other thicknesses, the silica layer preferably has a thickness of at least 100 nm, preferably in the range of about 125-500 nm. This maximizes the degree of angle dependent color travel, which is inherent in silica films. Here, the silica layers will have a thickness to provide a variable pathlength for light dependent on the angle of incidence of light impinging thereon. It is preferred that the low refractive index material layer have a sufficient thickness to provide at least more than 75 and, more preferably, more than 100 degrees of hue angle color travel.

The high refractive index layer (C) can be the same or different from the high refractive index layer (A) disposed on the substrate.

Materials suitable for the coating (C) of high refractive index are colorless metal oxides such as $TiO_2$, $ZrO_2$, $SnO_2$, ZnO and BiOCl, and also mixtures thereof. The thickness of the layer (C) is 10-550 nm, preferably 15-400 nm and, in particular, 20-350 nm.

Layer (D) is an optional final coating disposed on the (A)+(B)+(C) layer assembly.

In the present invention, layers (A), (C), or (D) can be formed of complex inorganic color pigments (CICP) such as copper chromite (aka Pigment Black 28), chrome antimony titanate, cobalt ferrite, iron titanate, bismuth vanadate, cobalt aluminate, etc.

Coating the substrates with layers (A) and (C) of high refractive index, a layer (B) of low refractive index and, if desired, further colored or colorless coatings produces pigments whose color, gloss, opacity and angular dependence of perceived color can be varied within wide limits. Layer (D), as mentioned above, may also be a complex inorganic colored pigment and it is an optional layer for enhancing mechanical properties, interfacial adhesion, weather stability, tactile properties or electromagnetic properties.

The color effect materials (CEMs) of the invention are advantageous for many purposes, such as the coloring of paints, printing inks, plastics, glasses, ceramic products, decorative cosmetics and personal care preparations. Their special functional properties make them suitable for many other purposes. The CEMs with a conductive outerlayer, for example, could be used in electrically conductive or electromagnetically screening plastics, paints or coatings or in conductive polymers. The conductive functionality of these CEMs makes them have great utility for powder coating applications.

The CEM's of the invention are easy to produce by virtue of the generation of two or more interference layers of high and low refractive index, precisely defined thickness and smooth surface on the finely divided, platelet-shaped substrates.

The metal oxide layers are preferably applied by wet-chemical means, it being possible to use the wet-chemical coating techniques developed for the production of pearl luster pigments; techniques of this kind are well known in the art.

In the case of wet coating, the substrate particles are suspended in water, and one or more hydrolysable metal salts are added at a pH which is appropriate for hydrolysis and is chosen such that the metal oxides or metal oxide hydrates are precipitated directly onto the platelets without any instances of secondary precipitation. The pH is kept constant usually by simultaneous metered addition of a base and/or acid. Subsequently, the pigments are separated off, washed and dried and, if desired, are calcined, it being possible to optimize the calcination temperature in respect of the particular coating present. In general, the calcination temperatures are between 250 and 1000° C., preferably between 350 and 900° C. If desired, following the application of individual coatings the CEM can be separated off, dried and, if desired, calcined before being resuspended for the application of further layers by precipitation.

Coating can also take place in a fluidized-bed reactor by means of gas-phase coating, in which case it is possible, for example, to make appropriate use of the techniques proposed in EP 0 045 851 and EP 0 106 235 for preparing pearl luster pigments.

The metal oxide of high refractive index used is preferably titanium dioxide and/or iron oxide, and the metal oxide of low refractive index preferably used is silicon dioxide.

For the application of the titanium dioxide layers, preference is given to the technique described in U.S. Pat. No. 3,553,001.

An aqueous titanium salt solution is added slowly to a suspension, heated to about 50-100° C., of the material to be coated, and a substantially constant pH of about 0.5-5 is maintained by simultaneous metered addition of a base, for example aqueous ammonia solution or aqueous alkali metal hydroxide solution. As soon as the desired layer thickness of the $TiO_2$ precipitate has been reached, the addition of both titanium salt solution and base is terminated.

This technique, also referred to as the titration process, is notable for the fact that it avoids an excess of titanium salt. This is achieved by supplying to the hydrolysis only that quantity per unit time which is necessary for uniform coating with the hydrated $TiO_2$ and which can be received per unit time by the available surface area of the particles to be coated.

The application of the silicon dioxide layers can be performed, for example, as follows. A potassium or sodium silicate solution is metered into a suspension, heated to about 50-100° C., of the substrate that is to be coated. The pH is held constant at about 6-10 by simultaneous addition of a dilute mineral acid, such as HCl, $HNO_3$ or $H_2SO_4$. As soon as the desired layer thickness of $SiO_2$ has been reached, the addition of the silicate solution is terminated. The batch is subsequently stirred for about 0.5 h.

In order to enhance the light stability and weather stability it is frequently advisable to subject the finished pigment to an aftercoating or after-treatment process, depending on the field of use. Suitable such processes are those described, for example, in DE-C 22 15 191, DE-A 31 51 354, DE-A 32 35 017 or DE-A 33 34 598. Such aftercoating further increases the chemical stability or facilitates the handling of the CEM, especially the incorporation thereof into different media.

The CEM's of the invention are compatible with a large number of color systems, preferably from the sector of lacquers, paints and printing inks, especially security printing inks. The invention also provides for the use of the pigments of the invention in decorative coatings, plastics, ceramic materials, glasses, cosmetic and personal care formulations. Owing to the uncopyable optical effects, the pigments of the invention can be used in particular for producing counterfeit-protected documents of value, such as bank notes, cheques, cheque cards, credit cards, identity cards, etc. In addition, the pigments are also suitable for the laser marking of paper and plastics and for applications in the agricultural sector, such as for glasshouse films, for example.

Products of this invention have an unlimited use in all types of automotive and industrial paint applications, especially in the organic color coating and inks field where deep color intensity is required. For example, these CEM's can be used in mass tone or as styling agents to spray paint all types of automotive and non-automotive vehicles. Similarly, they can be used on all clay/formica/wood/glass/metal/enamel/ceramic and non-porous or porous surfaces. The CEM's can be used in powder coating compositions. They can be incorporated into plastic articles geared for the toy industry or the home. These CEM's can be impregnated into fibers to impart new and esthetic coloring to clothes, wall paper and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, N.Y. (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the CEM may be used at a level of 10 to 15% in an offset lithographic ink, with the remainder being a vehicle containing gelled and ungelled hydrocarbon resins, alkyd resins, wax compounds and aliphatic solvent. The CEM may also be used, for example, at a level of 1 to 10% in an automotive paint formulation along with other pigments, which may include titanium dioxide, acrylic lattices, coalescing agents, water or solvents. The CEM may also be used, for example, at a level of 20 to 30% in a plastic color concentrate in polyethylene.

In the cosmetic field, the CEMs can be used in all cosmetic and personal care applications subject, of course, to all regulatory requirements. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion and gels (moisturizing, cleansing, analgesic, astringent), after shave lotion, after bath milk and sunscreen lotion.

For a review of cosmetic applications, see Cosmetics: Science and Technology, 2nd Ed., Eds: M. S. Balsam and Edward Sagarin, Wiley-Interscience (1972) and deNavarre, The Chemistry and Science of Cosmetics, 2nd Ed., Vols 1 and 2 (1962), Van Nostrand Co. Inc., Vols 3 and 4 (1975), Continental Press, both of which are hereby incorporated by reference.

The aspect of the present invention is to provide a CEM having strong interference colors and/or a strong angular dependence of the interference colors along with unique bulk color attributes, which is notable for its advantageous performance properties and which at the same time can be prepared in a simple manner.

It is of course the case that for the various target applications the multilayer pigments can also be employed advantageously in blends with other pigments, examples being transparent and hiding white, colored and black pigments, and with platelet-shaped iron oxides, organic pigments, holographic pigments, LCPs (liquid crystal polymers) and conventional transparent, colored and black color effect material based on metal oxide-coated mica and $SiO_2$ platelets, etc. The multilayer pigments can be mixed in any proportion with customary commercial pigments and extenders.

The examples which follow are intended to illustrate the invention yet without placing any limitation on it.

In order to demonstrate the invention, various examples are set forth below. In these examples, as well as throughout this specification and claims, all parts and percentages are by weight, all weights are dry weight, and all temperatures are in degrees Centigrade, unless otherwise indicated.

Example 1

A 5 liter Morton flask was equipped with a mechanical stirrer and charged with a suspension of 180 grams of mica having a major dimension average particle size of 20 microns and minor dimension of about 0.5 microns in 2.0 liters of distilled $H_2O$. The slurry was stirred at 300 RPM and the pH was lowered to 3.2 using 39% $FeCl_3$. The slurry was heated to 78° C. 200 grams of 39% $FeCl_3$ was added to the slurry at 1 ml/min while keeping the pH constant at 3.2 by adding aqueous sodium hydroxide solution (35% NaOH). The slurry pH was raised to 6.5 by adding aqueous sodium hydroxide solution (35% NaOH).

29.32 grams of $CuCl_2.2H_2O$ dissolved in 100 mls of distilled water and 366 grams of 25% $CrCl_3.6H_2O$ were each added to the slurry at a rate of 1 ml/min while maintaining the pH at 6.5 by adding aqueous sodium hydroxide solution (35% NaOH). 800 mls of the slurry was decanted.

The pH was raised to 8.5 by adding aqueous sodium hydroxide solution (35% NaOH). 2,700 grams of 28% $Na_2SiO_3.9H_2O$ solution were added at 4 ml/min while maintaining the pH at 8.5 by adding hydrochloric acid (1:1 HCl). The slurry was again decanted when necessary. The suspension pH was then lowered to 1.9 by adding hydrochloric acid (1:1 HCl) and 183.4 grams of 40% $TiCl_4$ solution was added at 1 ml/minute. The pH was maintained at 6.5 by adding aqueous sodium hydroxide solution (35% NaOH). The product was calcined at three different temperatures, 350° C., 650° C. and 850° C. The resulting product contained approximately 20% $CuCr_2O_4$. The approximate optical thickness of the $SiO_2$ layer was 300 nm.

Example 2

A 5 liter Morton flask was equipped with a mechanical stirrer and charged with a suspension of 180 grams of mica having a major dimension average particle size of 20 microns and minor dimension of about 0.5 microns in 2.0 liters of distilled $H_2O$. The slurry was stirred at 300 RPM and the pH was lowered to 3.2 using 39% $FeCl_3$. The slurry was heated to 78° C. 200 grams of 39% $FeCl_3$ was added to the slurry at 1 ml/min while keeping the pH constant at 3.2 by adding aqueous sodium hydroxide solution (35% NaOH). The slurry pH was raised to 6.5 by adding aqueous sodium hydroxide solution (35% NaOH).

14.66 grams of $CuCl_2.2H_2O$ dissolved in 100 mls of distilled water and 183 grams of 25% $CrCl_3.6H_2O$ were each added to the slurry at a rate of 1 ml/min while maintaining the pH at 6.5 by adding aqueous sodium hydroxide solution (35% of NaOH). 800 mls of the slurry was decanted.

The pH was raised to 8.5 by adding aqueous sodium hydroxide solution (35% NaOH). 3,115 grams of 28% $Na_2SiO_3.9H_2O$ solution were added at 4 ml/min while maintaining the pH at 8.5 by adding hydrochloric acid (1:1 HCl). The slurry was again decanted when necessary. The suspension pH was then lowered to 1.9 by adding hydrochloric acid (1:1 HCl) and 183.4 grams of 40% $TiCl_4$ solution was added at 1 ml/minute. The pH was maintained at 6.5 by adding aqueous sodium hydroxide solution (35% NaOH). The product was calcined at temperatures of 350° C., 650° C. and 850° C. The resulting product contained approximately 10% $CuCr_2O_4$ and showed color travel. The approximate optical thickness of the $SiO_2$ layer was 369 nm.

Example 3

A 5 liter Morton flask was equipped with a mechanical stirrer and charged with a suspension of 180 grams of mica having a major dimension average particle size of 20 microns and minor dimension of about 0.5 microns in 2.0 liters of distilled $H_2O$. The slurry was stirred at 300 RPM and the pH was lowered to 3.2 using 39% $FeCl_3$. The slurry was heated to 78° C. 200 grams of 39% $FeCl_3$ was added to the slurry at 1 ml/min while keeping the pH constant at 3.2 by adding aqueous sodium hydroxide solution (35% NaOH). The slurry pH was raised to 8.5 by adding aqueous sodium hydroxide solution (35% NaOH). 3,115 grams of 28% $Na_2SiO_3.9H_2O$ solution were added at 4 ml/min while maintaining the pH at 8.5. The suspension pH was lowered to 1.9 by adding hydrochloric acid (1:1 HCl) and 180 grams of 40% $TiCl_4$ solution was added at 1 ml/minute. The pH was maintained at 1.9. The pH was raised to 6.5 by adding aqueous sodium hydroxide solution (35% NaOH).

7.33 grams of $CuCl_2.5H_2O$ dissolved in 50 mls of distilled water and 91.5 grams of 25% $CrCl_3.6H_2O$ were each added to the slurry at a rate of 1 ml/min at a pH of 6.5. The product was calcined at temperatures of 350° C., 650° C. and 850° C. The resulting product contained approximately 5% $CuCr_2O_4$ and showed color travel, color purity and luster. The approximate optical thickness of the $SiO_2$ layer was 369 nm.

Example 4

The procedure of Example 3 was repeated except that 14.66 grams of $CuCl_2.5H_2O$ were dissolved in 50 mls of distilled water and 183 grams of 25% $CrCl_3.6H_2O$ were used to produce 10% $CuCr_2O_4$. The product exhibited color travel with a bulk color of copper chromite.

What is claimed is:

1. A color effect material comprising a laminar substrate having at least one layer sequence comprising: (A) a layer having a high refractive index disposed on the substrate; (B) a layer having a low refractive index disposed on said layer (A); (C) a layer having a high refractive index disposed on said layer (B); and (D), an external layer disposed on said layer (C); wherein at least one of said layers (A) or (C) comprises copper chromite; and wherein the outermost layer of said color effect material contains no copper chromite.

2. The color effect material of claim 1 wherein the layer (B) has a refractive index $\leq 1.9$.

3. The color effect material of claim 1 wherein the layer (B) is silicon dioxide.

4. The color effect material of claim 1 wherein the layer (A) and the layer (C) both have a refractive index of $\geq 1.95$.

5. The color effect material of claim 1 wherein the layer (A) is a metal oxide and the layer (C) is copper chromite.

6. The color effect material of claim 1 wherein the layer (A) is iron oxide.

7. The color effect material of claim 1 wherein the layer (A) and the layer (C) both comprise metal oxides.

8. The color effect material of claim 3 wherein the layer (A) is iron oxide.

* * * * *